Nov. 9, 1954    F. C. COLLIN    2,694,097
ELECTRIC SMELTING EQUIPMENT AND METHOD OF USING SAME
Filed June 21, 1952    6 Sheets-Sheet 1

Nov. 9, 1954            F. C. COLLIN            2,694,097

ELECTRIC SMELTING EQUIPMENT AND METHOD OF USING SAME

Filed June 21, 1952            6 Sheets-Sheet 4

INVENTOR
Fredrik Christen Collin
BY
ATTORNEYS

Nov. 9, 1954  F. C. COLLIN  2,694,097
ELECTRIC SMELTING EQUIPMENT AND METHOD OF USING SAME
Filed June 21, 1952  6 Sheets-Sheet 5
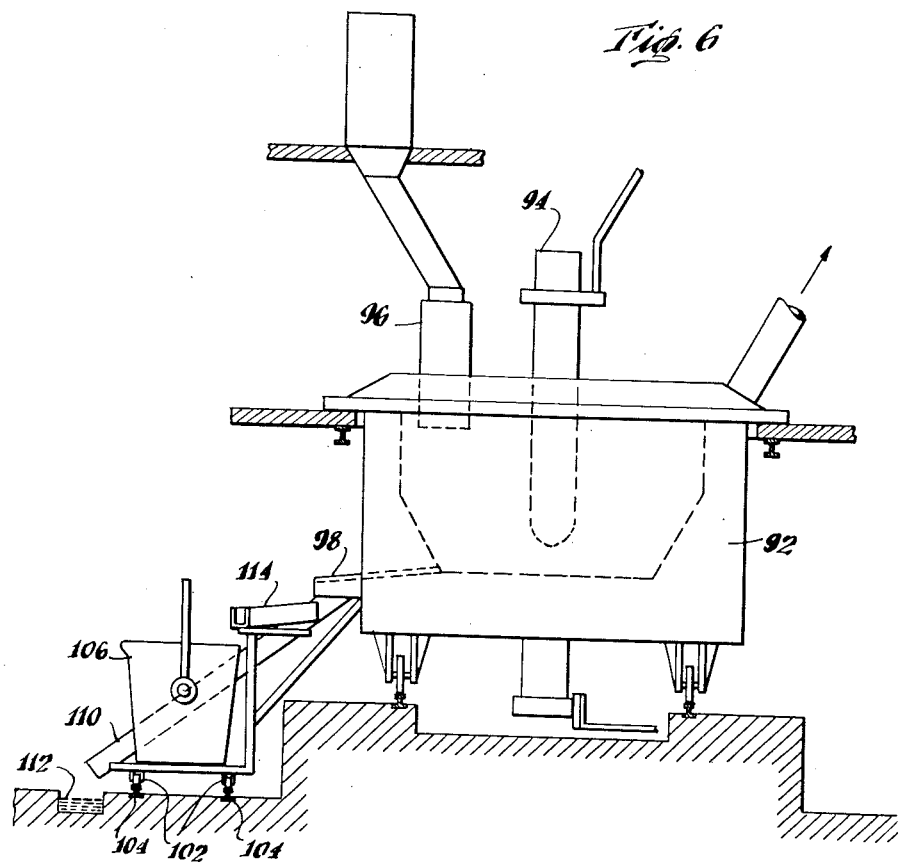
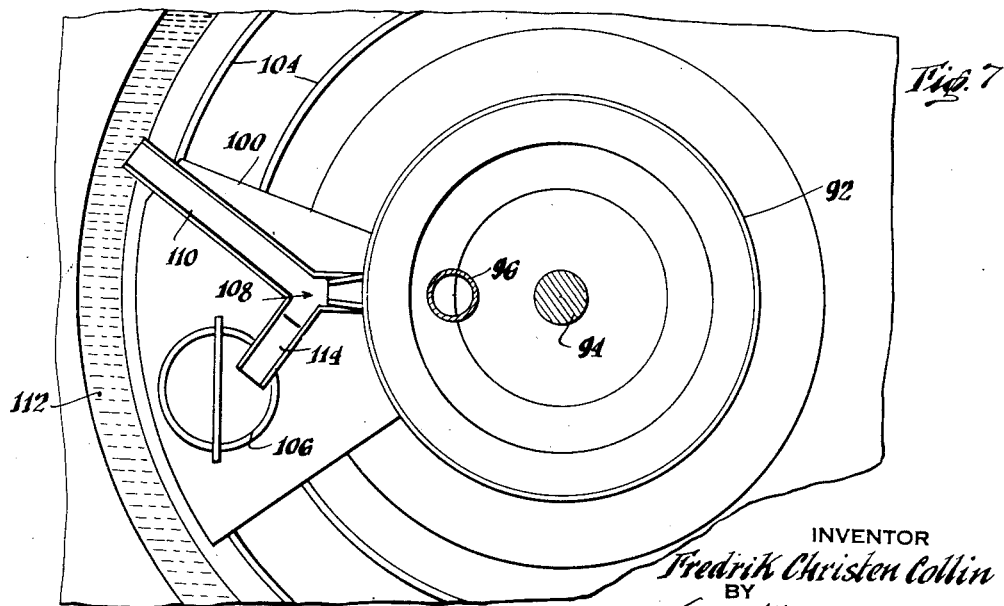
INVENTOR
Fredrik Christen Collin
BY
Eyre, Mann & Burrows
ATTORNEYS Nov. 9, 1954

F. C. COLLIN 2,694,097

ELECTRIC SMELTING EQUIPMENT AND METHOD OF USING SAME

Filed June 21, 1952

INVENTOR
Fredrik Christen Collin
BY
Eyre, ........
ATTORNEYS

United States Patent Office 2,694,097
Patented Nov. 9, 1954

2,694,097
ELECTRIC SMELTING EQUIPMENT AND METHOD OF USING SAME

Fredrik Christen Collin, Oslo, Norway, assignor to Elektrokemisk A/S, Oslo, Norway, a corporation of Norway Application June 21, 1952, Serial No. 294,793

16 Claims. (Cl. 13—23)

This invention relates to electric furnaces of the type used for smelting and the like.

The essential feature of the furnace of this invention is that I employ only a single electrode in a substantially circular furnace which is hung from above, independent of the furnace body, and then supply means whereby the furnace body or pot is given rotative motion about the electrode as an axis. Ordinarily the furnace will have a roof or cover and the electrode will pass through this roof with one electrical connection to the electrode above the roof and the other connection to the furnace pot.

By having the electrode arranged axially of the furnace pot it is not subjected to any substantial pressure strains from the charge so that the charge can be filled in, in the usual manner, to a depth such that the charge surrounds the electrode.

The primary advantage of having the axially positioned electrode and the pot which is given rotative motion, is that this greatly simplifies the problem of distributing the charge uniformly around the electrode. Heretofore in order to get uniform distribution, a number of charging shafts had to be employed. For example, in United States Patent No. 2,392,517 it is suggested that the angular distance between charging shafts should not be more than 60° and preferably not more than 45°. By using the construction of my present invention it clearly is possible to maintain a uniform distribution of the charge employing only a single charging shaft. In some cases as where the furnace is large or is given a relatively slow oscillatory rotative motion, two charging shafts may be employed but it will seldom be necessary to employ more than two. In any event, my furnace arrangement may be defined as one in which even distribution of the charge around the electrode can be had with an average of at least 100° angular spacing between charging shafts.

In order to get uniform distribution the charge should be fed continuously at a uniform rate and the rotative speed of the furnace should be great enough so that such continuous feeding can be carried out without overloading the furnace. Usually an angular speed of between 2° and 15° per minute is satisfactory and for many purposes a preferred speed is from 1 to 2 revolutions per hour (3° to 6° per minute). When I refer to the feeding as being "continuous," I don't mean to imply that feeding must go on at all times, as in some operations it may be desirable to have a continuous, even feed for some time—say, a full revolution of the furnace—and then interrupt the feeding for an appreciable time.

This new method of distributing the charge by feeding it to a rotating furnace pot greatly simplifies the mechanics of handling the material to be treated and also simplifies the collection of gas from the closed furnace. Because of these factors my new type of furnace is particularly adapted to be employed with a preheating furnace which preferably will utilize the gases from the electric smelting operation as all or part of its source of heat, that is, the gases from the smelting furnace containing large quantities of CO can be led to the preheating furnace and there burned with additional air. This can be done either by a separate conduit or the gases may return to the heating furnace through the same conduit that is used for feeding the charge to the smelting furnace, or both operations may go on simultaneously.

The use of a rotating smelting furnace creates some problems. One of these is the tapping of the furnace and another is the transmission of electric energy to the moving pot. If tapping of the furnace is to take place in the usual way, the pot must be stopped before tapping. This may sometimes be undesirable and my invention therefore also comprises a tapping device permitting the tapping while the pot is rotating.

For some purposes it will be satisfactory to supply current to the moving pot by brushes or the like but in other cases where heavy current must be transmitted I have found that this can be done by making a contact between a metal plate on the one side and molten metal on the other.

While ordinarily the rotative movement of the pot will be a continuous circular movement, in other instances it may be desirable to give the pot a reciprocating or oscillating movement and both types of movement are intended to be included in the expression "a rotative movement."

The furnace embodying my present invention may, with advantage, be employed for electrothermic processes requiring an especially high temperature such, for example, as the smelting of ferro-alloys rich in silicon. In such processes there is a tendency for the charge to sinter easily and to hang, making it necessary to stoke a furnace and break in the crust in advance of additional charging. By using the furnace of the present invention, this difficulty may readily be overcome by employing a fixed stoking device which will operate to break the crust shortly in advance of the charge and which will act to push the charge towards the electrode. (See below in connection with the description of Fig. 4.) Thus very efficient stoking conditions can be had at the point immediately before that at which new material is to be introduced.

This invention may be readily understood from the accompanying drawings which show some examples of its application to smelting furnaces and their auxiliaries.

The figures in the drawings are as follows:

Fig. 6 is a side view with the furnace shown in elevation and the foundation shown in section where the furnace is provided with a device for tapping during rotation of the furnace pot.

Fig. 7 is a plan view of the furnace shown in Fig. 6.

Fig. 8 is a view corresponding with Fig. 6 where the furnace is provided with a different type of tapping device intended for use in an operation where no slag is produced.

Figure 1:
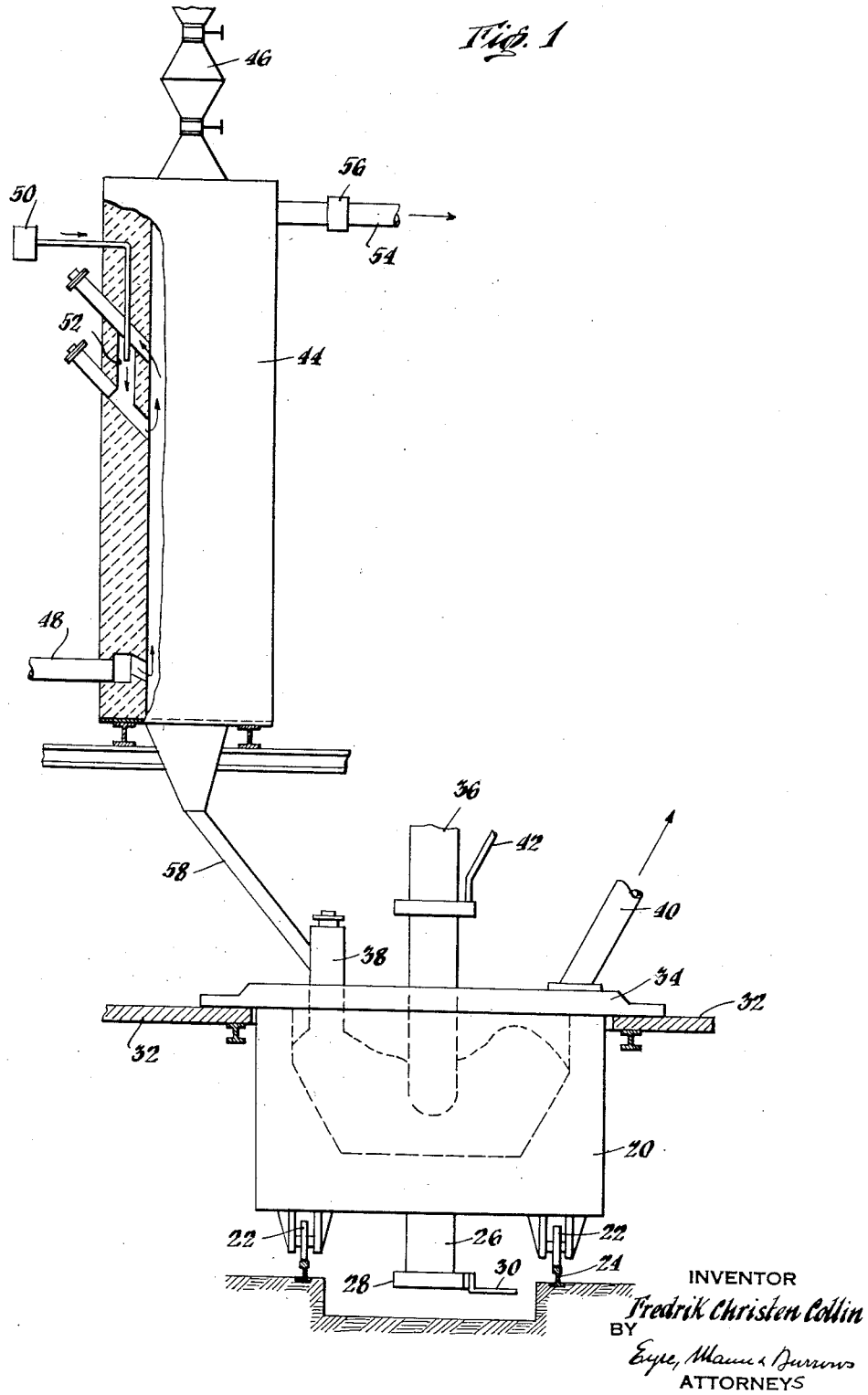
Fig. 1 is a diagrammatic elevation partly in section of an electric smelting furnace embodying the present invention which is operated in connection with a shaft furnace for pre-treatment of the charge.

In the drawings, 20 is the pot of the electric furnace. This is provided with wheels 22 that roll on a track 24 to permit the pot to rotate. Any desirable form of mechanism for rotating the pot may be employed such as shown, for example, in Ellefsen Patent No. 2,300,355. In this embodiment a downwardly extending column 26 is provided with a ring member 28 so that electric current can be transmitted to it through the brush 30.

A working platform 32 surrounds the pot and carries a stationary cover 34. An electrode 36 suspended above the pot in any desired fashion passes down through the cover 34 so that it is centered on the axis of the pot 20. A charging shaft 38 also passes down through the cover 34 and passage 40 is provided for withdrawing gases from within the furnace. An electrical connection is made to the electrode 36 as indicated at 42.

In operating the furnace the charge is admitted to the furnace through the shaft 38 and the furnace is given a rotative motion at sufficient speed so that the charge will be finely distributed around the shaft as indicated in broken lines. It is to be noted that the charge surrounds the lower part of the electrode and slopes from the line of shaft 38 toward the electrode so that there is a movement of material on the surface. This of course means that when the furnace is not overloaded a gas space will remain beneath the cover 34 as indicated by the broken lines in Fig. 1. In order to get an even distribution of the charge around the shaft, I have found for example that it is satisfactory to have the furnace rotate one full revolution in from 1 to 2 hours.

In the embodiment shown in Fig. 1 the furnace is shown as an element in a plant intended for reduction processes and includes in addition to the electric smelting furnace 20 a shaft furnace 44 for pre-treatment of the ore. The charge is introduced into the furnace 44 through a bin or container 46 in ordinary fashion by the use of two gas-tight doors. Gas withdrawn from the furnace 20 by the pipe 40 may be admitted into the shaft furnace 44 through the pipe 48. As this gas is rich in CO, it can be burned in the furnace 44 to preheat the charge. In the upper part of the shaft furnace air for combustion is supplied by a fan or compressor 50. The burning of the combustible gases from the furnace may take place in combustion chambers 52 built into the lining of the furnace 44. The gas ducts are thereby simplified and the heat loss from the shaft is reduced. In Fig. 1 an arrangement is shown whereby gas will be drawn into the combustion chamber in the upper part of the furnace due to the injection effect from the air supplied for combustion. This air is introduced at high speed and the combustion gases mixed with air are pushed downwardly and again introduced into the shaft furnace. It is understood that this is only given as one desirable way of conducting the operation and the combustion gases and air may be mixed outside of the furnace in a well-known manner.

The combustion gases from the upper part of the shaft furnace are exhausted through the pipe 54 by means of a fan 56. As the heating takes place in countercurrent the outlet temperature of the gases may be kept as low as 100 to 200° C. The charge will leave the lower end of the shaft furnace preheated to a temperature of 800 to 1000° C. With the charge partly reduced, it will sink continuously by gravity through the pipe 58 which enters the shaft 38.

This arrangement illustrates the simplicity with which the charge from such a furnace can be introduced into my new type of furnace with a rotative pot and also the simple manner in which the gases can be collected and re-used. Obviously the details of handling the gases and the charge may be modified as desired.

Figure 2:
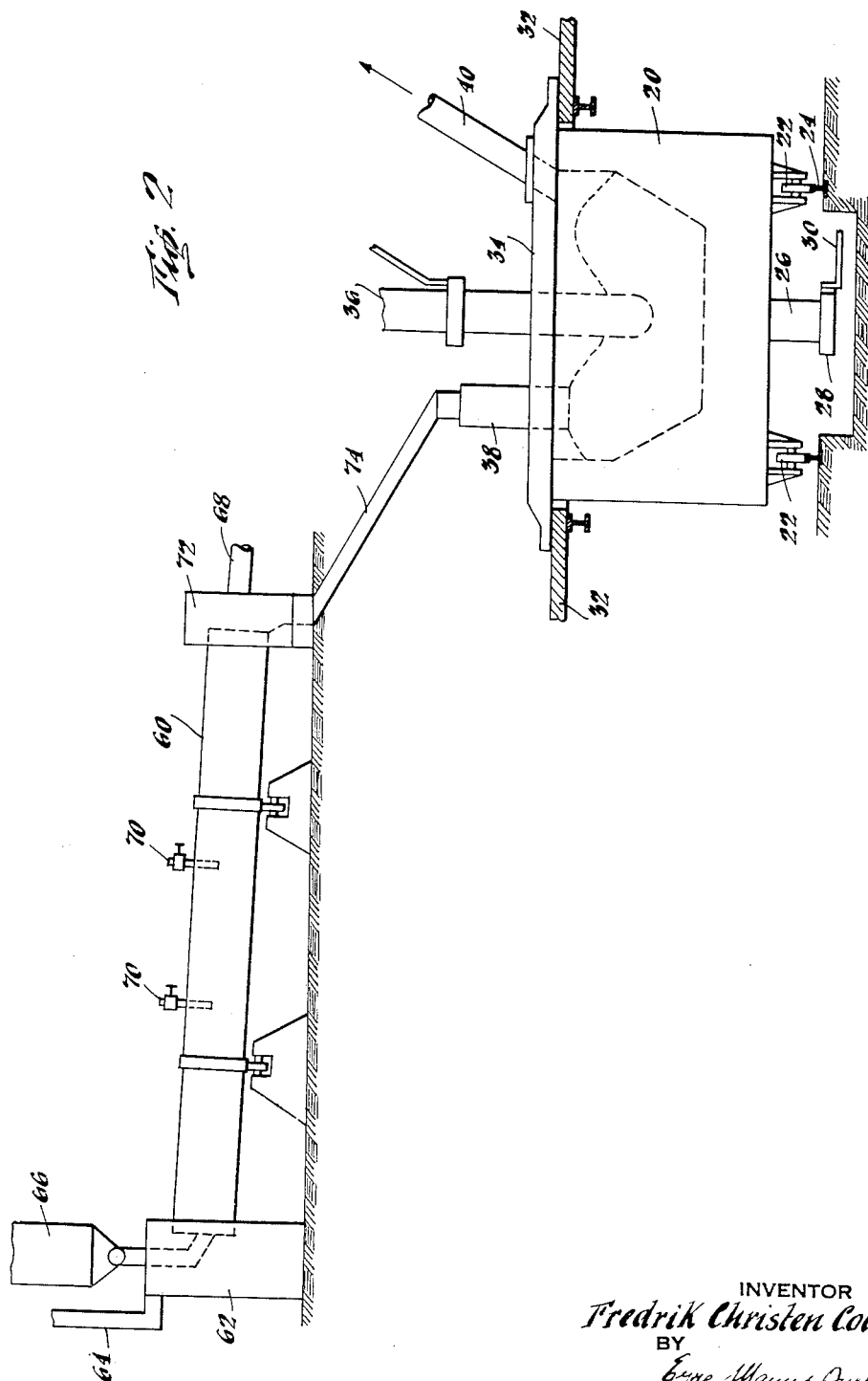
Fig. 2 is a corresponding view showing the same type of smelting furnace in connection with a rotary furnace for pre-treatment of the charge.

In Fig. 2 the furnace pot is identical with that shown in Fig. 1 and therefore the same reference characters are employed with it. In this case instead of using a shaft furnace a rotary preheating furnace is employed. This avoids the necessity of using a briquetted charge or coarse ore or lumps of coke to obtain sufficient porosity in the charge to permit the gas to pass through. In the rotary furnace there is no substantial loss of pressure and it may easily be operated with a slight vacuum which makes it possible to operate with atmospheric pressure in the smelting furnace and maintain a working connection between the smelting furnace and the pre-heating furnace.

In this figure I show a rotary furnace 60 having at its upper end a smoke chamber 62 connected to a stack 64. The charge is fed from a storage bin 66 and passes through the rotary furnace in countercurrent with the gases which are admitted into the furnace through pipe 68 which it is understood is to be connected to the gas exhaust pipe 40 of the electric furnace 20. These gases are to be admixed with appropriate air for combustion as is well understood in the art. In addition, further combustion air may be admitted into the furnace 60 as by radially positioned pipes 70 arranged at various points. From the discharge end of the rotary furnace 60 the material passes through a gas-tight chamber 72 and thence through the pipe 74 to the shaft 38 of the furnace 20. It is noted that in this case if gas from the furnace travels upwardly through the pipe 74 it will simply mix with the gas admitted through the pipe 68 and take part in the combustion.

In the pre-treatment of the charge of a rotary furnace such as illustrated, one may employ volatilized iron ore and similar fine-grained raw material. This may be mixed with a reducing agent such as low-grade coal or coke dust. The gas from the electric furnace will serve to heat the charge.

If ore and the carbonaceous reducing agent are present in finely divided form, a reduction will take place at temperatures above 900° C. more quickly than in a shaft furnace where coarse material must be employed. During the passage of the charge through the rotary furnace if the temperature exceeds 1000° C. some agglomeration of the fine particles will take place, with the result that a part of the charge will be in the form of relatively large lumps when fed into the electric furnace. Further, a practically complete reduction of the iron oxides may be effected in the rotary furnace, if desired, with addition of fuel in the form of gas or oil. In such case the development of gas in the smelting furnace pipes will be negligible, with the result that the electric furnace may handle even a fine-grained charge without danger of blowing or boiling the slag.

The devices as illustrated in the figures heretofore described indicate the simple manner in which a preheated charge may be fed to a smelting furnace and distributed uniformly around the electrode. In addition to pig iron smelting, this operation may be used in the smelting of ilmenite or ferro-alloys and in other reduction processes. In the smelting of ferro-manganese the CO gases may be employed for the pre-reduction of the $MnO_2$ of the manganese ore to $MnO$, and for preheating the charge. In carbide smelting, considerable reduction in the power consumption may be obtained in a similar way by utilizing the furnace gases for preheating the charge and also for calcination of limestone forming part of the charge.

In any of these cases the fact that the preheated material can be conducted to the furnace through a single pipe without being subdivided into a number of shafts greatly simplifies the problems and makes it possible to handle such preheated material without danger of air leaking in to react with the hot materials.

I have also found that the use of the single-phase furnace with a central electrode and a bottom contact is advantageous when using preheated materials, for with a three-phase furnace the preheated materials have such a lowered resistance that there is an increased tendency for the electric current to pass between the electrodes in the uppermost layers of the the charge. This will tend to the formation of open arcs between the electrodes and the charge, with poor thermal efficiency due to radiation of heat onto the furnace roof. With a single-phase furnace and bottom contact the current can only pass between the electrode and furnace bottom, and even with a preheated charge a satisfactory low position of the electrode can be obtained and free arcs are avoided. The speed of rotation of the furnace pot is adjusted to the smelting process and as previously stated, ordinarily (though by no means necessarily) will be between one and two revolutions per hour.

In connection with Fig. 2 I suggested the possibility of the pre-treatment of a mixed charge of ore and carbonaceous reducing agent. Under some circumstances, this may not be desirable. Experience has indicated that at temperatures of 800° C. or higher there is a tendency for $CO_2$ gas to react with coke to form CO but on the other hand it is very difficult to obtain any substantial reduction of iron ore at temperatures below 800° C. and therefore pre-reduction may be accompanied with an undesirable loss of carbon due to the reaction between $CO_2$ and coke.

To meet this condition it has been suggested that desirable results can be obtained by feeding reducing agent and preheated ore separately. Heretofore such treatment has not given satisfactory results due to the fact that it has been hard to obtain a proper proportioning of the ore and reducing agent and they have not been sufficiently well mixed when they reached the smelting crater.

By the use of the present invention it has been found possible to meter the materials into the furnace with sufficient accuracy and it has also been found that by feeding the charge through a rotating furnace, an adequate mixture is obtained.

In carrying out this operation, that part of the charge which consists of ore and possible additions is fed continuously with a reliable feeding device of the type now available on the market or in small proportions in a definite rhythm into a furnace for pre-treatment, from which the hot material gradually sinks into a smelting furnace. The reducing agent which may be preheated up to say 800° C. with combustion gases free from oxygen but which preferably is not so preheated, is likewise fed to the furnace at a point adjacent the point where the ore is fed and in the simplest embodiment both are fed through a single shaft. In the latter case the heated ore and the unheated coke may be collected in an intermediate storage bin or hopper above the smelting furnace from which they are fed together into the furnace.

This latter procedure is especially adapted for smelting processes where the charge comprises a considerable quantity of burned lime, for example, in the production of pig iron from slag resulting from matte smelting and from iron ore rich in $SiO_2$ or in the production of calcium carbide. Calcination of limestone takes place at about 1200° C. and by feeding the burned lime from the calcination furnace to the electric smelting furnace without substantial cooling the power consumption may be reduced.

Figure 3:
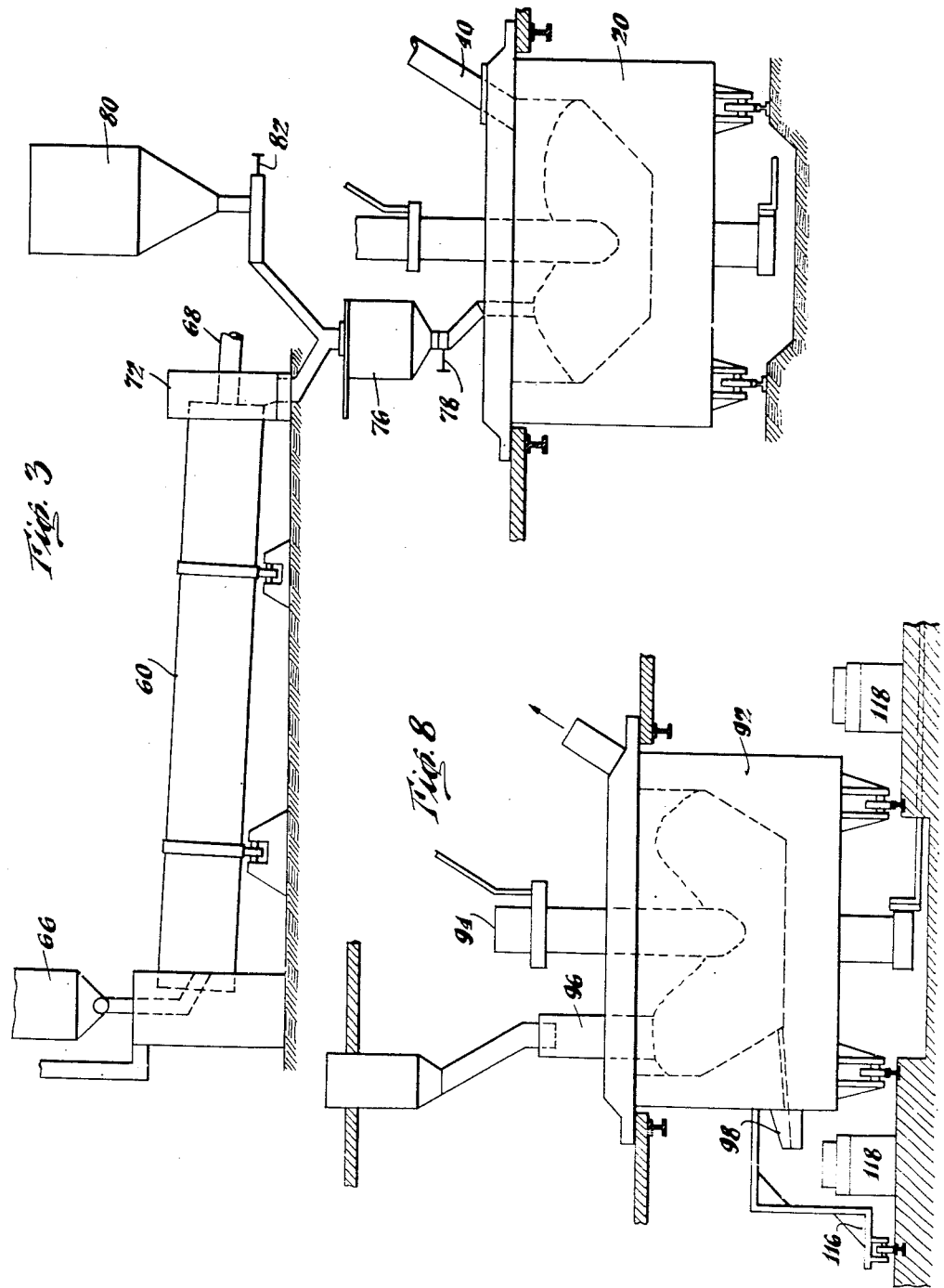
Fig. 3 is a view similar to Fig. 2 showing an arrangement having a storage bin between the two furnaces. This may be used, for example, for calcination of limestone.

A plant for carrying out the last described process is shown in Fig. 3 which employs a furnace 60 similar to the furnace shown in Fig. 2 and a smelting furnace 20 similar to the furnace shown in Figs. 1 and 2. In this case the furnace 60 is used for the calcination of limestone supplied from the bin 66. The hot lime from this furnace is discharged through the closed chamber 72 to an intermediate bin 76 from which the charge goes into a smelting furnace in the manner heretofore described. Normally the bin 76 will be empty as the material is fed continuously into the smelting furnace but if it is desired to stop charging without interrupting the operation of the rotary furnace 60 a supply of material may be held in the bin 76 by means of valve 78. The reducing agent is supplied from a bin 80 by means of a feeding apparatus indicated at 82 to the bin 76 where it is mixed with the hot lime. The CO gas from the smelting furnace is exhausted through the pipe 40 and may be used as fuel for the lime kiln, being introduced with air into pipe 68, all as heretofore described. However, when producing calcium carbide one must use some additional fuel, for example in the form of oil to generate sufficient heat to burn the lime. It is understood that the bin 76 and the pipes through which the hot materials are to flow should be well insulated.

As I have pointed out above, smelting furnaces used for smelting ferro-alloys rich in silicon and the like require especially high temperatures. In such processes there is a great danger that the charge will sinter and hang. For example in the production of 75% FeSi the charge will form a hard crust shortly after being fed into the furnace. As a result the gas developed in the smelting operation by reaction between quartz and coke escapes with great speed through narrow craters in the crust and the furnace is said to "blow."

To counteract "blowing" the furnace operators stoke and break down the crust before adding a new charge. It is well known that when smelting a charge of material such as 75% FeSi, the output and power consumption depend almost entirely on the effectiveness of the furnace operation, that is, the frequency and efficiency with which the stoking is carried out.

I have found that by feeding a rotating pot at one or two points it is possible to operate the furnace very efficiently by positioning a stoking machine in such point that the crust is broken just before the charge is admitted. Such a stoking machine may for example be of the general type illustrated in United States Patent No. 2,473,681. While such a stoking machine operates intermittently, satisfactory results can be had if it is operated in a definite rhythm.

Figure 4:
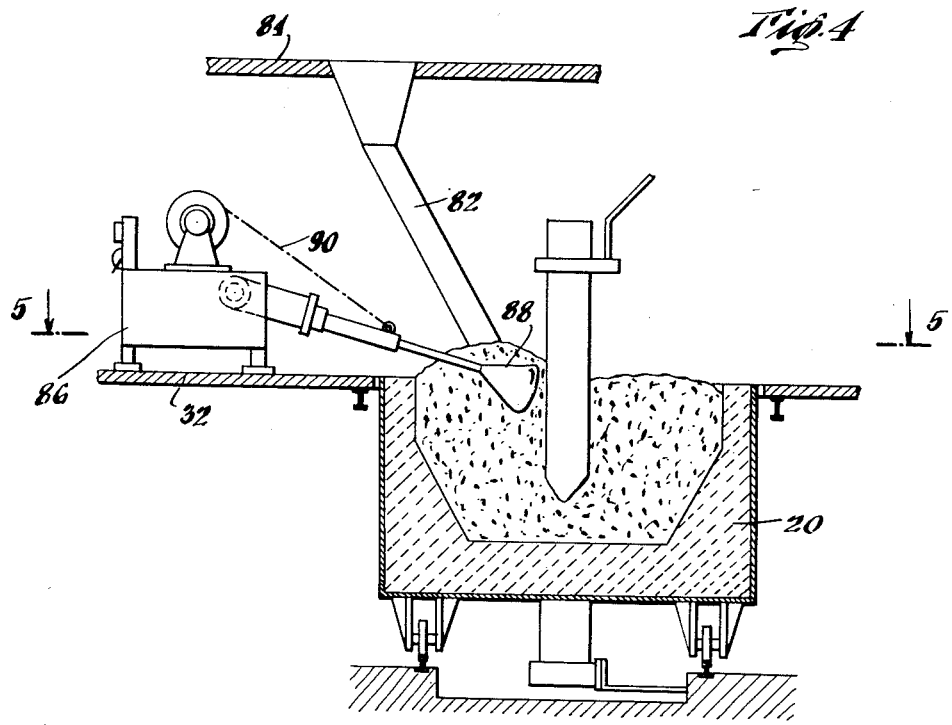
Fig. 4 is a diagrammatic view in section through the axis of an open smelting furnace provided with a stoking device.
Figure 5:
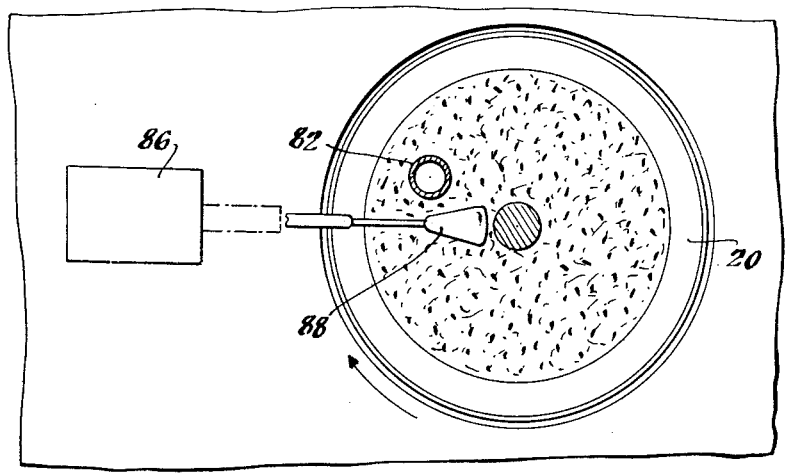
Fig. 5 is a plan view of Fig. 4 partly in section on the line 5—5 of Fig. 4.

Such an arrangement is shown in Figs. 4 and 5. Here the rotating furnace 20 is similar to that already described but it is not provided with a cover 34. In this case the charge is admitted to the furnace through pipe 82 coming from an upper charging floor 84. A stoking apparatus 86 is positioned on the platform 32. It is understood that the weighted head 88 is periodically raised and lowered by the cable 90 as described in said Patent No. 2,473,681. As shown in Fig. 5 the weighted head 88 operates on the furnace just in advance of the point where the new charge is introduced.

By adjusting the frequency of operation of the stoking apparatus the intensity of the treatment of the charge can be regulated according to the requirement of the smelting process in question. The supply of new charge is regulated by adjustment of the speed of rotation of the furnace.

While the operation of the stoking device is illustrated on an open furnace, it is understood that it may likewise be employed with a furnace in which the top is enclosed for the collection of gases.

When tapping a smelting furnace according to my invention, certain problems are met with due to the rotation of the furnace pot. Of course, one may stop the rotative motion of the pot and tap the furnace in the usual way but in such case the supply of charge stops when the movement of the pot stops. In smelting processes requiring a frequent or long tapping of the furnace, such interruption may be detrimental.

I have found that this difficulty may be met either by supplying a platform which will rotate around the axis of the pot with the furnace and on which the tapping operation can be conducted or by supplying a ring of molds into which the tapping spout will discharge the molten material as the pot rotates.

The first of these devices is illustrated in Figs. 6 and 7. In these figures the pot 92 has the centrally located electrode 94 and the charging shaft 96 as has already been described. In this case the pot is also provided with a tapping spout 98. A platform 100 is mounted to rotate on wheels 102 which are carried on track 104. This platform carries the ladle 106 and a Y-shaped tapping launder 108 for separating slag and metal in usual manner. In this case the slag is shown as being discharged by the leg 110 into the trough 112, whereas the metal discharges through the leg 114 into the ladle 106. The platform 80 may follow the pot completely around its regular course or may move with the pot through such an arc as is necessary to accomplish the tapping operation.

In Fig. 8 a tapping platform 116 is provided which rotates with the furnace pot 92 which is similar to the pot shown in Fig. 6. In this case, which is intended to illustrate an operation where no slag is obtained as in the making of calcium carbide, a series of molds 118 are positioned in a circle around the pot so that the molten material can be run into them as desired. It is understood that the tapping operator can stand on the platform 116.

In the constructions thus far described the bottom connection to the pot is shown as being made through a ring and brushes. In some cases very heavy electrical charges have to be employed reaching as much as 100,000 amperes or more which renders such construction impracticable and expensive. It has been found that these difficulties can be avoided by supplying a trough around the furnace carrying molten metal into which a metal plate dips. Ordinarily it will be advisable to have the trough carried by the pot and the metal plate supported on the outside but this arrangement is not essential.

Figure 9:
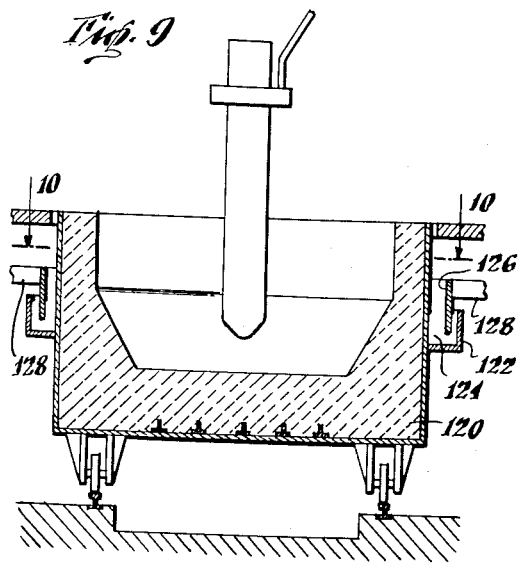
Fig. 9 is a sectional view of a furnace with a cover and charging shaft removed, where the furnace is provided with a special arrangement for transmitting current to the furnace pot.
Figure 10:
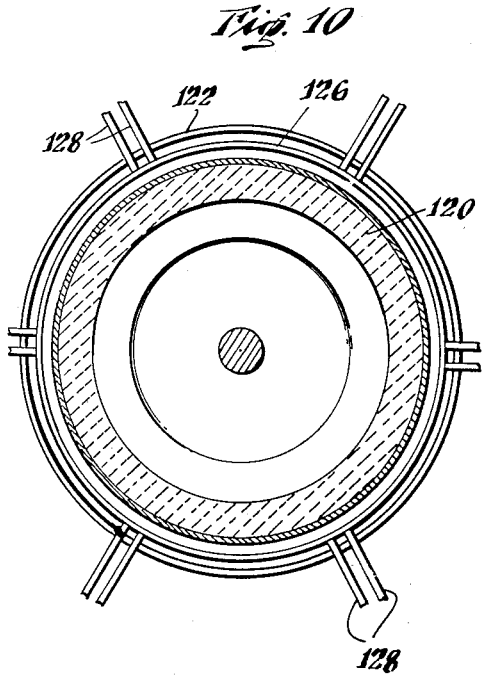
Fig. 10 is a plan view of the furnace shown in Fig. 9 with the furnace platform removed.

Such a construction is illustrated in Figs. 9 and 10. Here the pot 120 is provided with a cirmumferential pocket or trough 122 containing molten metal. The most suitable metals for this purpose are tin and lead and alloys of these metals, and Wood's metal (melting point 68° C.) which also contains bismuth and cadmium. Tin presents an excellent combination of a low melting point (231° C.) and comparatively low electrical resistance, but lead is also serviceable and cheaper. A metal ring 126 surrounds the pot and dips into the molten metal 124 contained in the trough 122. Bus bars 128 are connected to this ring at spaced intervals as shown in Fig. 10. Current from these bus bars is transmitted through the ring 126 to the molten metal 124 and thence to the furnace pot 120.

If the furnace is of the closed type, there should be a sand seal or some other form of packing between the stationary roof and the revolving furnace pot. In such case one may employ a seal of easily fusible metal as described above, and have the stationary furnace roof carry the metal ring which dips into the molten metal.

Figure 11:
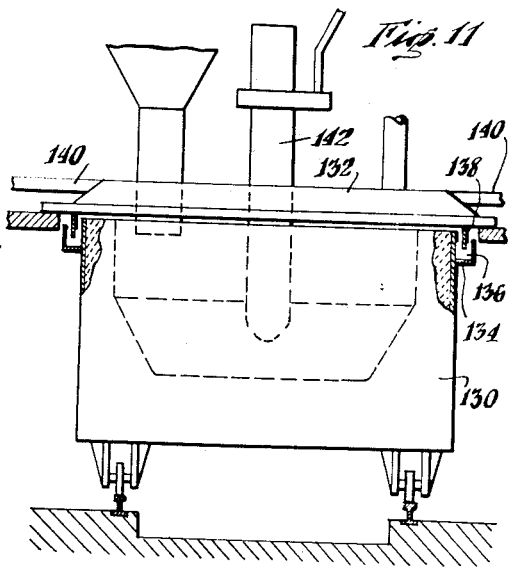
Fig. 11 is an elevation (with some parts shown in section) of a furnace provided with a roof or cover and provided with an alternative arrangement for current supply.
Figure 12:
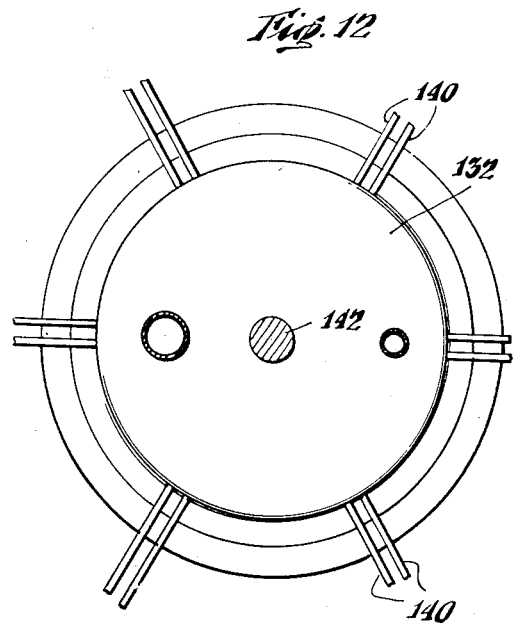
Fig. 12 is a corresponding plan view with the furnace platform removed to show the electrical connections.

Such construction is illustrated in Figs. 11 and 12. Here the pot 130 is provided with a stationary roof 132. On the sides of the pot 130 is a trough 134 carrying molten metal 136. The roof has a downwardly depending ring or flange 138 which enters into this molten metal forming both a gas seal and also serving to make an electrical contact. The current is transmitted to the ring 138 by spaced bus bars 140. Obviously, this roof must be carefully insulated from the central electrode 142.

In one case a furnace of this type was constructed having an external diameter of 7 meters and a single electrode with a diameter of 1500 millimeters. The plate thickness of the furnace pot was 25 millimeters and this gave an iron cross-section of just under 60,000 square millimeters. In such case a load of 100,000 amperes gives a current density of 0.17 ampere per $mm.^2$. If the conductivity of iron is compared with copper it will be found that such a furnace pot has sufficient cross-section to supply the current to the bottom contact.

It is understood that the examples given are intended only by way of illustration and that the same may be modified in many particulars without departing from the spirit of my invention.

What I claim is:

1. In a furnace for electric smelting and the like, a substantially circular furnace pot, an electrode positioned in the center of the pot, means for giving the pot rotative movement around the electrode as an axis and spout-like means for delivering substantially all of the charge into the furnace pot eccentrically of the electrode and at a level substantially above the bottom tip of the electrode for a sufficient time while the pot is in motion so that the charge will be substantially evenly distributed around the electrode at a level high enough substantially to bury the lower tip of the electrode.

2. A structure as specified in claim 1 in which the means for delivering the charge is adapted to deliver it at more than one point but the average angular distance between the points where the charge is delivered is at least 100°.

3. A structure as specified in claim 1 in which the means for giving the pot a rotative movement is adapted to give it a continuous rotation.

4. A structure as specified in claim 1 in which the means for giving the pot a rotative motion is adapted to move it at a rate of from 2° to 15° per minute.

5. A structure as specified in claim 1 which further includes a mechanical stoker positioned to break the crust in the furnace pot just in advance of the position where charge is introduced.

6. A structure as specified in claim 1 in which the electrical circuit is maintained through the furnace by one electrical contact connected with the central electrode and a second electrical contact connected with the furnace pot.

7. A structure as specified in claim 6 in which the furnace pot is provided with a circumferential trough around its exterior containing molten metal and a fixed plate dips into such metal and in which the said second electrical contact is made through such fixed plate.

8. A structure as specified in claim 7 in which the furnace pot has a cover and said fixed metal plate surrounds the pot and depends from the cover whereby such plate serves as a gas seal as well as an electrical conductor.

9. A structure as specified in claim 1 in which the furnace pot is supplied with a tapping spout and a tapping platform which is adapted to rotate with the pot.

10. A structure as specified in claim 9 in which such tapping platform is adapted to carry a ladle for receiving molten material tapped from the furnace.

11. A structure as specified in claim 10 in which the tapping platform also carries means for separating metal from slag.

12. In combination a preheating furnace, an electrical smelting furnace having a cover and a centrally positioned top electrode, a pipe for carrying charge from the preheating furnace to a shaft in the cover of the smelting furnace whereby exposure of the charge to air is substantially prevented and means for distributing such charge evenly about the electrode of the smelting furnace, comprising means whereby the pot of the smelting furnace is given a rotative movement about the electrode as an axis without rotating the cover.

13. A structure as specified in claim 12 in which gases from the smelting furnace are withdrawn through the cover and conducted to the preheating furnace and burned to supply heat thereto.

14. A structure as specified in claim 12 which further includes a separate source of reducing agent connected with said shaft whereby ore may be preheated in said first furnace and ore and reducing agent may be simultaneously introduced into said smelting furnace and mixed with the ore by the rotative movement of the furnace pot.

15. The method of operating an electric furnace of the type used for smelting and the like having a central substantially round electrode extending into a substantially round pot, which comprises rotating the pot around the electrode while feeding all the material into the pot through one or more spouts adapted to discharge such material adjacent the electrode but at a level substantially above the lower tip of the electrode so that such material will flow towards and bury the lower part of the electrode, and adjusting the rate of feed to the rate of rotation of the pot so that the material in the pot will be distributed substantially evenly about the electrode at a level substantially above the bottom tip of the electrode.

16. A method as specified in claim 15 in which the furnace pot is provided with a cover and the material is fed into the pot at such a rate that a substantial space is left between the top of the material and the cover of the furnace.

References Cited in the file of this patent

UNITED STATES PATENTS

| Number | Name | Date |
| --- | --- | --- |
| 602,815 | Clark | Apr. 19, 1898 |
| 706,099 | Parker | Aug. 5, 1902 |
| 966,542 | Hartenstein | Aug. 9, 1910 |
| 1,249,151 | McKee | Dec. 4, 1917 |
| 1,778,809 | Miguet | Oct. 21, 1930 |
| 1,878,392 | George | Sept. 20, 1932 |
| 2,008,495 | Ferguson | July 16, 1935 |
| 2,231,104 | Berghaus et al. | Feb. 11, 1941 |
| 2,300,355 | Ellefsen | Oct. 27, 1942 |
| 2,473,681 | Hansen | June 21, 1949 |
| 2,592,517 | Ingelsrud | Apr. 8, 1952 |